(12) United States Patent
Kakubari et al.

(10) Patent No.: US 9,477,088 B2
(45) Date of Patent: Oct. 25, 2016

(54) THREE-DIMENSIONAL IMAGE DISPLAY APPARATUS

(71) Applicant: ARISAWA MFG. CO., LTD., Niigata (JP)

(72) Inventors: Yuichi Kakubari, Niigata (JP); Tatsuya Sato, Niigata (JP)

(73) Assignee: ARISAWA MFG. CO., LTD., Niigata (JP)

(*) Notice: Subject to any disclaimer, the term of this patent is extended or adjusted under 35 U.S.C. 154(b) by 220 days.

(21) Appl. No.: 13/911,038

(22) Filed: Jun. 5, 2013

(65) Prior Publication Data

US 2013/0265641 A1    Oct. 10, 2013

Related U.S. Application Data

(63) Continuation of application No. PCT/JP2011/004992, filed on Sep. 6, 2011.

(30) Foreign Application Priority Data

Dec. 10, 2010   (JP) .................... 2010-276375

(51) Int. Cl.
*G02B 27/22* (2006.01)
*G02B 27/26* (2006.01)
(Continued)

(52) U.S. Cl.
CPC ........... *G02B 27/2228* (2013.01); *G02B 27/22* (2013.01); *G02B 27/26* (2013.01);
(Continued)

(58) Field of Classification Search
CPC ................. G02B 27/22; G02B 27/26
USPC ........................ 359/462, 465, 883
See application file for complete search history.

(56) References Cited

U.S. PATENT DOCUMENTS 5,672,400 A * 9/1997 Hansen et al. ............... 428/40.1
5,863,970 A * 1/1999 Ghoshal et al. ............. 523/434
(Continued)

FOREIGN PATENT DOCUMENTS

| CN | 101493581 A | 7/2009 |
|---|---|---|
| JP | 2005-91834 A | 4/2005 |
| JP | 2010-134404 A | 6/2010 |

OTHER PUBLICATIONS

Notice of Office Action for Chinese Patent Application No. 201110229495.1, issued by the Chinese Intellectual Property Office on Jul. 21, 2014.
(Continued)

*Primary Examiner* — Thomas K Pham
*Assistant Examiner* — Mitchell Oestreich

(57) ABSTRACT

A three-dimensional image display apparatus includes: an image output unit that outputs image light that has a particular polarization, the image output unit having: a retaining substrate including a transparent glass; an optical element retained by the retaining substrate; and a resin polarizing plate pasted with a first adhesive layer on a side of the retaining substrate opposite to a side where the optical element is retained; and a retarder that is pasted onto the polarizing plate with a second adhesive layer and has: a transparent resin base; and a plurality of phase retarding parts that are provided on the resin base and output the image light as mutually differently polarized light, the image light having been incident on the plurality of phase retarding parts, wherein the second adhesive layer is as hard as or harder than the first adhesive layer.

10 Claims, 5 Drawing Sheets

(51) Int. Cl.
*G03B 35/18* (2006.01)
*H04N 13/04* (2006.01)
*G02F 1/1335* (2006.01)
*G02F 1/13363* (2006.01)

(52) U.S. Cl.
CPC ......... *G03B 35/18* (2013.01); *H04N 13/0434* (2013.01); *H04N 13/0436* (2013.01); *G02F 2001/133538* (2013.01); *G02F 2001/133541* (2013.01); *G02F 2001/133631* (2013.01); *G02F 2201/38* (2013.01); *G02F 2201/54* (2013.01); *G02F 2202/28* (2013.01); *G02F 2203/01* (2013.01); *G02F 2203/60* (2013.01); *H04N 2213/001* (2013.01); *Y10T 156/10* (2015.01)

(56) References Cited

U.S. PATENT DOCUMENTS

| | | | |
|---|---|---|---|
| 2003/0001989 A1* | 1/2003 | Kusumoto et al. | 349/96 |
| 2006/0098281 A1 | 5/2006 | Fukushima et al. | |
| 2006/0146202 A1* | 7/2006 | Ioki et al. | 348/739 |
| 2009/0040401 A1 | 2/2009 | Tamura et al. | |
| 2010/0073604 A1 | 3/2010 | Okuyama et al. | |
| 2010/0208177 A1* | 8/2010 | Kobayashi et al. | 349/102 |
| 2010/0265433 A1* | 10/2010 | Hoshi | 349/62 |
| 2010/0277657 A1 | 11/2010 | Fukushima | |

OTHER PUBLICATIONS

Preliminary Notice of First Office Action for Patent Application No. 100132693, issued by the Taiwanese Intellectual Property Office on Jun. 12, 2014.

International Search Report for International Application No. PCT/JP2011/004992, issued by the Japanese Patent Office on Oct. 4, 2011.

International Preliminary Report on Patentability for International Application No. PCT/JP2011/004992, issued by the International Bureau of WIPO on Jun. 12, 2013.

Notification of the First Office Action of Chinese Application No. 2011102294951, issued by the State Intellectual Property Office of the P.R. of China on Dec. 24, 2013.

* cited by examiner

| COMPONENT (REFERENCE SYMBOL) | | EXAMPLE 1 | EXAMPLE 2 | EXAMPLE 3 | EXAMPLE 4 | EXAMPLE 5 | EXAMPLE 6 |
|---|---|---|---|---|---|---|---|
| RESIN BASE | MATERIAL | COP | COP | COP | COP | COP | TAC |
| | THICKNESS | 50μm | 50μm | 50μm | 50μm | 100μm | 80μm |
| | DIMENSIONAL CHANGE RATE A | 70ppm/°C | 70ppm/°C | 70ppm/°C | 70ppm/°C | 70ppm/°C | 54ppm/°C |
| ADHESIVE LAYER (44) | CHARACTERISTIC | HARD | EXTREMELY HARD | HARD | HARD | EXTREMELY HARD | EXTREMELY HARD |
| | THICKNESS | 25μm | 30μm | 25μm | 25μm | 30μm | 30μm |
| | STORAGE ELASTIC MODULUS | 0.7MPa | 2.3GPa | 0.7MPa | 0.7MPa | 2.3GPa | 2.3GPa |
| POLARIZING PLATE (34) | THICKNESS | 200μm | 200μm | 200μm | 100μm | 200μm | 200μm |
| ADHESIVE LAYER (32) | CHARACTERISTIC | SOFT | SOFT | HARD | HARD | SOFT | SOFT |
| | THICKNESS | 25μm | 25μm | 25μm | 25μm | 25μm | 25μm |
| | STORAGE ELASTIC MODULUS | 0.3MPa | 0.3MPa | 0.7MPa | 0.7MPa | 0.3MPa | 0.3MPa |
| DIMENSIONAL CHANGE RATE B | MD (ppm/°C) | 17 | 10 | 12 | 10 | 10 | −19 |
| | TD (ppm/°C) | 23 | 18 | 13 | 19 | 20 | −21 |

| COMPONENT (REFERENCE SYMBOL) | | COMPARATIVE EXAMPLE 1 | COMPARATIVE EXAMPLE 2 |
|---|---|---|---|
| RESIN BASE | MATERIAL | COP | COP |
| | THICKNESS | 50μm | 100μm |
| | DIMENSIONAL CHANGE RATE A | 70ppm/°C | 70ppm/°C |
| ADHESIVE LAYER (44) | CHARACTERISTIC | SOFT | SOFT |
| | THICKNESS | 25μm | 25μm |
| | STORAGE ELASTIC MODULUS | 0.3MPa | 0.3MPa |
| POLARIZING PLATE (34) | THICKNESS | 200μm | 200μm |
| ADHESIVE LAYER (32) | CHARACTERISTIC | EXTREMELY HARD | EXTREMELY HARD |
| | THICKNESS | 30μm | 30μm |
| | STORAGE ELASTIC MODULUS | 2.3GPa | 2.3GPa |
| DIMENSIONAL CHANGE RATE B | MD (ppm/°C) | 44 | 60 |
| | TD (ppm/°C) | 74 | 70 |

FIG. 6

THREE-DIMENSIONAL IMAGE DISPLAY APPARATUS

The contents of the following Japanese patent application are incorporated herein by reference: NO. 2010-276375 filed on Dec. 10, 2010.

BACKGROUND

1. Technical Field

The present invention relates to a three-dimensional image display apparatus.

2. Related Art

A three-dimensional image display apparatus including an image output unit that outputs image light, and another optical component such as a polarizing plate and a retarder that is pasted with an adhesive layer onto the image output unit that is one optical component is known (see, for example, Patent Document No. 1).

Patent Document No. 1: Japanese Patent Application Publication No. 2005-91834

SUMMARY OF THE INVENTION

Problems to be Solved by the Invention

However, when dimensional changes of any of the optical components are significant, positional deviation occurs between the one optical component such as the image output unit and the other optical component such as the polarizing plate and the retarder, and image quality of a three-dimensional image degrades.

Means for Solving the Problems

A first aspect of the present invention provides a three-dimensional image display apparatus including: an image output unit that outputs image light that has a particular polarization, the image output unit having: a retaining substrate including a transparent glass; an optical element retained by the retaining substrate; and a resin polarizing plate pasted with a first adhesive layer on a side of the retaining substrate opposite to a side where the optical element is retained; and a retarder that is pasted onto the polarizing plate by a second adhesive layer and has: a transparent resin base; and a plurality of phase retarding parts that are provided on the resin base and output the image light as mutually differently polarized light, the image light having been incident on the plurality of phase retarding parts, wherein the second adhesive layer is as hard as or harder than the first adhesive layer.

A second aspect of the present invention provides a method of manufacturing a three-dimensional image display apparatus, the method including: manufacturing an image output unit that outputs image light that has a particular polarization, the image output unit having: a retaining substrate including a transparent glass; an optical element retained by the retaining substrate; and a resin polarizing plate pasted with a first adhesive layer on a side of the retaining substrate opposite to a side where the optical element is retained; manufacturing a retarder that has: a transparent resin base; and a plurality of phase retarding parts that are provided on the resin base and output the image light as mutually differently polarized light, the image light having been incident on the plurality of phase retarding parts; and pasting the retarder onto the image output unit with a second adhesive layer that is as hard as or harder than the first adhesive layer.

The summary clause does not necessarily describe all necessary features of the embodiments of the present invention. The present invention may also be a sub-combination of the features described above.

BRIEF DESCRIPTION OF THE DRAWINGS

FIG. 6 is a table that shows experimental results about dimensional changes.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
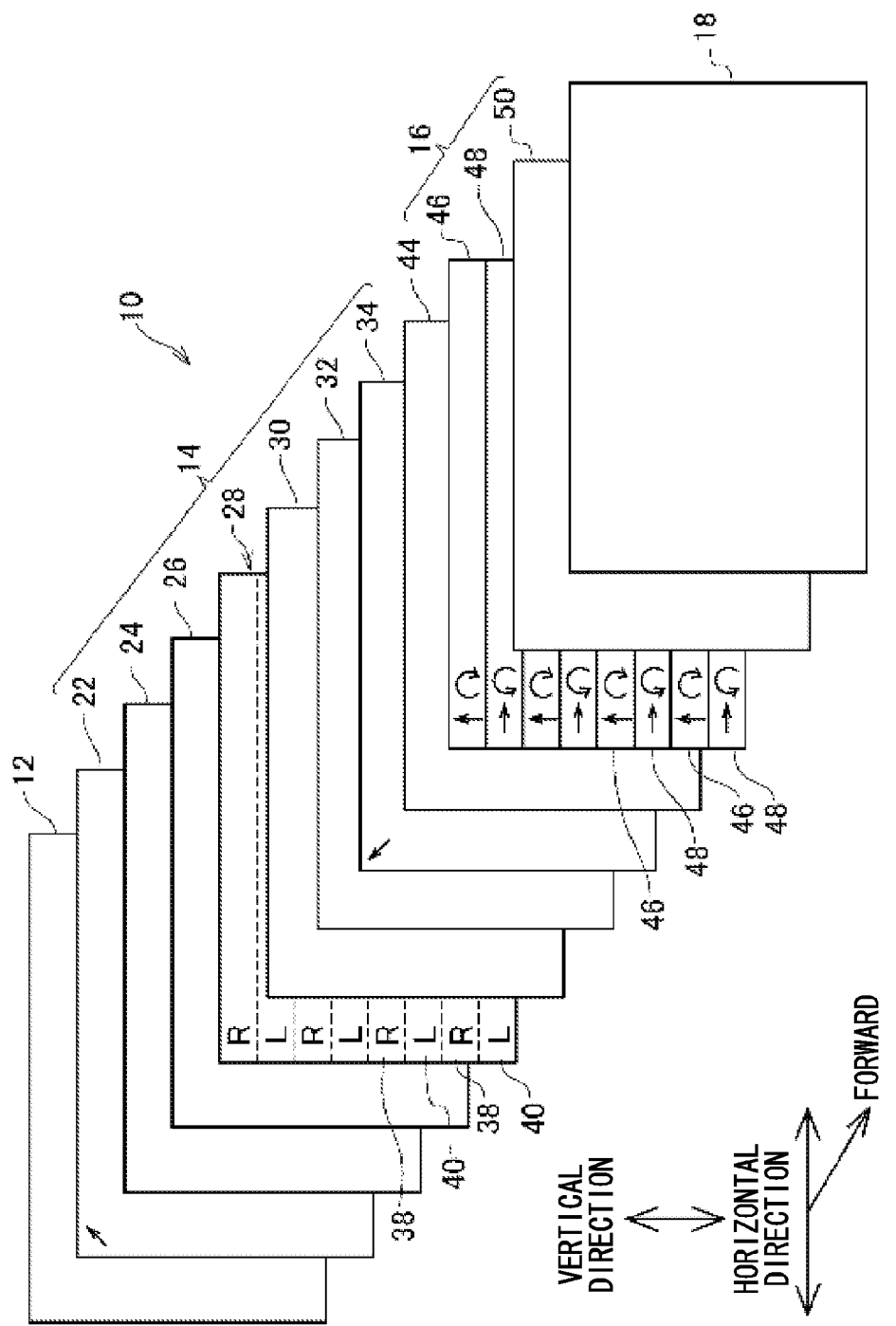
FIG. 1 is an exploded perspective view of a three-dimensional image display apparatus.

FIG. 1 is an exploded perspective view of a three-dimensional image display apparatus. As indicated with an arrow in FIG. 1, the direction in which a user is positioned and toward which an image is output is referred to as the forward direction of the three-dimensional image display apparatus. As shown in FIG. 1, a three-dimensional image display apparatus 10 includes a light source 12, an image output unit 14, an adhesive layer 44 which is an example of a second adhesive layer, a retarder 16, and an anti-reflection film 18.

The light source 12 irradiates with a white unpolarized light at an intensity which is substantially uniform within a plane. The light source 12 is, as seen from the user, arranged at a rearmost portion of the three-dimensional image display apparatus 10. The light source 12 may be a light source configured by combining a diffuser panel and a cold-cathode tube (CCFL: cold cathode fluorescent lamp), a light source configured by combining a Fresnel lens and a light-emitting diode (LED), a surface light source including an organic EL (electro-luminescence), and the like.

The image output unit 14 is arranged before the light source 12. The image output unit 14 outputs an image using light from the light source 12. The image output unit 14 includes a polarizing plate 22, an adhesive layer 24, a retaining substrate 26, an optical element 28, a retaining substrate 30, an adhesive layer 32 and a polarizing plate 34. The adhesive layer 32 is an example of a first adhesive layer.

The polarizing plate 22 is arranged between the light source 12 and the retaining substrate 26. The polarizing plate 22 is constituted with a resin such as PVA (polyvinyl alcohol). Note that the material for constituting the polarizing plate 22 may be modified as appropriate. The polarizing plate 22 is pasted onto the rear surface of the optical element 28 with the adhesive layer 24. The polarizing plate 22 has a transmission axis which is inclined by 45° from the horizontal direction, and an absorption axis which is orthogonal to the transmission axis. Thereby, among the unpolarized light that is output from the light source 12 and incident on the polarizing plate 22, components whose vibration directions are parallel with the transmission axis of the polarizing plate 22 are allowed to transmit through, and components whose vibration directions are parallel with the absorption axis are absorbed and blocked. Accordingly, light that is output from the polarizing plate 22 is linearly polarized light whose polarization axis is the transmission axis of the polarizing plate 22.

The adhesive layer 24 is provided on the entire rear surface of the retaining substrate 26 substantially uniformly. An acrylic adhesive may be applied as the adhesive layer 24. Also, as the adhesive layer 24, an adhesive sheet or a pressure sensitive adhesive sheet may be applied. The polarizing plate 22 is pasted onto the rear surface of the retaining substrate 26 with the adhesive layer 24.

The retaining substrate 26 is arranged between the polarizing plate 22 and the optical element 28. A transparent glass plate may be applied as the retaining substrate 26. Note that, as the retaining substrate 26, other than a glass plate, a transparent composite sheet in which a transparent composite material including a transparent resin and a glass cloth is used may be used. Thereby, weight reduction and flexibility of the three-dimensional image display apparatus 10 can be achieved. The rear surface of the retaining substrate 26 retains the polarizing plate 22 via the adhesive layer 24.

The optical element 28 is arranged between and retained by the retaining substrate 26 and the retaining substrate 30. The optical element 28 has right eye image generating units 38 that generate right eye images, and left eye image generating units 40 that generate left eye images as indicated with "R" and "L" in FIG. 1. The right eye image generating units 38 and the left eye image generating units 40 are formed as rectangles that extend in the horizontal direction. The right eye image generating units 38 and the left eye image generating units 40 are arranged alternately in the vertical direction.

The optical element 28 has a plurality of pixels for generating images. The plurality of pixels is arranged two-dimensionally at constant intervals in the vertical direction and the horizontal direction. The pixel denotes a unit about an image, and outputs color information about color tones and gradation. Each pixel has three sub-pixels. Each sub-pixel has a liquid crystal part, and transparent electrodes formed on the front and rear surfaces of the liquid crystal part. The transparent electrode applies voltage to the liquid crystal part. The liquid crystal part to which voltage is applied rotates a polarization axis of linearly polarized light by 90°. The three sub-pixels included in each pixel have a red color filter, a green color filter and a blue color filter, respectively. An image is formed by intensifying or lessening red, green and blue light output from a sub-pixel by controlling voltage applied by the transparent electrodes of the sub-pixel.

The retaining substrate 30 is arranged between the optical element 28 and the polarizing plate 34. The retaining substrate 26 and the retaining substrate 30 sandwich the optical element 28. A transparent glass plate may be applied as the retaining substrate 30. Note that, as the retaining substrate 30, other than a glass plate, a transparent composite material including a transparent resin and a glass cloth is used may be used. Thereby, weigh reduction and flexibility of the three-dimensional image display apparatus 10 can be achieved. The front surface of the retaining substrate 30 retains the polarizing plate 34 via the adhesive layer 32.

The adhesive layer 32 is provided on the entire front surface of the retaining substrate 30 substantially uniformly. An acrylic adhesive may be applied as the adhesive layer 32. Also, as the adhesive layer 32, an adhesive sheet or a pressure sensitive adhesive sheet may be applied. The polarizing plate 34 is pasted onto the front surface of the retaining substrate 30 with the adhesive layer 32.

The polarizing plate 34 is arranged between the retaining substrate 30 and the retarder 16. The polarizing plate 34 is pasted with the adhesive layer 32 on a side of the retaining substrate 30 that is opposite to a side on which the optical element 28 is retained. The polarizing plate 34 is constituted with a resin such as PVA (polyvinyl alcohol). The thickness of the polarizing plate 34 is preferably smaller. The thickness of the polarizing plate 34 is for example 100 to 200 μm. The polarizing plate 34 has a transmission axis and an absorption axis that is orthogonal to the transmission axis. The transmission axis of the polarizing plate 34 is orthogonal to the transmission axis of the polarizing plate 22. Thereby, linearly polarized light whose polarization axis is rotated by 90° by the optical element 28 transmits through the polarizing plate 34 to be image light that forms an image. On the other hand, linearly polarized light whose polarization axis is not rotated by the optical element 28 is blocked by the polarizing plate 34. Thereby, the image output unit 14 outputs image light that has a particular polarization.

The retarder 16 is pasted before the polarizing plate 34 of the image output unit 14 with the adhesive layer 44. The retarder 16 modulates polarization of right eye images and left eye images formed with linearly polarized light having polarization axes in the same direction into different polarization. The thickness of the retarder 16 is preferably smaller in order to suppress dimensional changes of the retarder 16. Furthermore, it is preferred to suppress dimensional changes of the polarizing plate 34 by making the polarizing plate 34 thinner. Thereby, dimensional change of the retarder 16 can be suppressed further. However, if a polarizing plate is made thinner and a thick retarder is pasted onto the polarizing plate with a hard adhesive layer, influence of dimensional changes of the retarder on the polarizing plate becomes more significant. As a result, dimensional changes of the polarizing plate become more significant along with dimensional changes of the retarder. Accordingly, based on these facts, there is a limit to the extent of thinning of the polarizing plate 34. Taking these things into consideration, the thickness of the retarder 16 is preferably 50 to 200 μm. Furthermore, as regards the relationship between the thickness of the retarder 16 and the thickness of the polarizing plate 34, the retarder 16 is preferably thinner than the polarizing plate 34. For example, if the thickness of the retarder 16 is 50 μm, the thickness of the polarizing plate 34 is preferably about 100 μm. The retarder 16 has a plurality of pairs of phase retarding parts 46 and phase retarding parts 48, and a resin base 50.

The adhesive layer 44 is provided on the entire front surface of the polarizing plate 34 substantially uniformly. The adhesive layer 44 is harder than the adhesive layer 32. An example of materials to constitute the adhesive layer 44 is a material including a UV curable resin. Also, as the adhesive layer 44, an adhesive sheet or a pressure sensitive adhesive sheet may be applied. The phase retarding part 46 and the phase retarding part 48 are pasted onto the front surface of the polarizing plate 34 with the adhesive layer 44.

The phase retarding part 46 and the phase retarding part 48 are provided on the rear surface of the resin base 50. The phase retarding part 46 and the phase retarding part 48 are arranged on the same vertical plane. The phase retarding part 46 and the phase retarding part 48 are arranged alternately in the vertical direction.

The phase retarding part 46 is formed as a rectangle that extends in the horizontal direction. The phase retarding part 46 has the substantially same shape as that of the right eye image generating unit 38 of the optical element 28. The phase retarding part 46 is arranged before the right eye image generating unit 38. The phase retarding part 46 modulates polarization of incoming polarized light. The phase retarding part 46 is a quarter wave phase retarder that converts linearly polarized light into circularly polarized light. The optical axis of the phase retarding part 46 is parallel with the vertical direction as indicated by arrows provided at the left end of the phase retarding part 46 in FIG. 1. Thereby, the phase retarding part 46 modulates a linearly polarized light that is incident from the polarizing plate 34 into a clockwise circularly polarized light as indicated with arrows that are provided on the right of the arrows about the optical axis. Note that the optical axis is a phase advance axis or a phase delay axis.

The phase retarding part 48 is formed as a rectangle that extends in the horizontal direction. The phase retarding part 48 has the substantially same shape as that of the left eye image generating unit 40 of the optical element 28. The phase retarding part 48 is arranged before the left eye image generating unit 40. The phase retarding part 48 modulates polarization of incoming polarized light. The phase retarding part 48 is a quarter wave phase retarder that converts linearly polarized light into circularly polarized light. The optical axis of the phase retarding part 48 is parallel with the horizontal direction as indicated with arrows provided at the left end of the phase retarding part 48 in FIG. 1. Thereby, the phase retarding part 48 modulates linearly polarized light that is incident from the polarizing plate 34 into a counterclockwise circularly polarized light as indicated on the right of the arrows about the optical axis. Accordingly, the phase retarding part 46 and the phase retarding part 48 convert the linearly polarized light that is image light to constitute right eye images and left eye images and output as circularly polarized light with different polarization axes.

Here, a user wears polarized glasses when he/she is about to see a three-dimensional image. The right eye lens of the polarized glasses transmits clockwise circularly polarized light that constitutes a right eye image output from the phase retarding part 46. On the other hand, the left eye lens transmits counterclockwise circularly polarized light that constitutes a left eye image output from the phase retarding part 48. Thereby, the user sees, with his/her right eye, only circularly polarized light output from the right eye image generating unit 38 and modulated by the phase retarding part 46. Also, the user sees, with his/her left eye, only circularly polarized light output from the left eye image generating unit 40 and modulated by the phase retarding part 48. As a result, the user recognizes the image as a three-dimensional image.

The resin base 50 is arranged at the front surfaces of the phase retarding part 46 and the phase retarding part 48. The resin base 50 retains the phase retarding part 46 and the phase retarding part 48. An example of the thickness of the resin base 50 is 50 to 100 μm. The resin base 50 is transparent. A cyclo-olefin film may be used as the resin base 50. As the cyclo-olefin film, cyclo-olefin polymer (=COP), more preferably cyclo-olefin copolymer (=COC), which is a copolymer of cyclo-olefin polymer may be used. Zeonor Film ZF14 manufactured by Zeon Corporation of Japan is an example of COP films. Also, the resin base 50 may be constituted with a material including triacetylcellulose (=TAC). FUJITAC T80SZ manufactured by FUJIFILM Corporation is an example of TAC films. Note that when a cyclo-olefin film is used, a highly ductile film is used preferably in terms of vulnerability.

The anti-reflection film 18 is arranged on the front surface of the retarder 16. The anti-reflection film 18 suppresses reflection of light output from the resin base 50. Thereby, the anti-reflection film 18 can highly efficiently provide a user with polarized light that constitutes an image.

Figure 2:
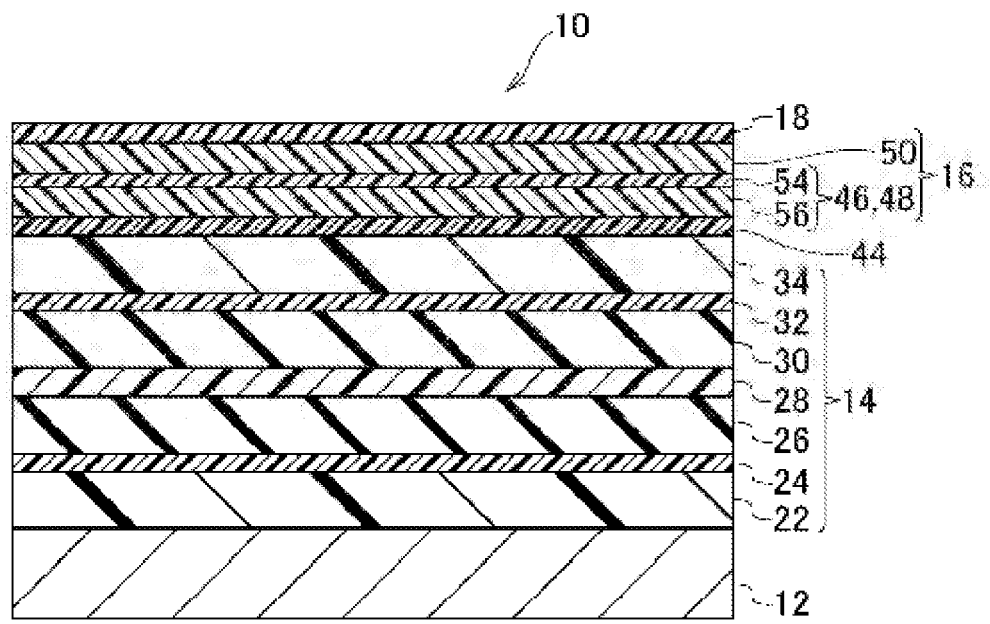
FIG. 2 is a cross-sectional view of the three-dimensional image display apparatus.

FIG. 2 is a cross-sectional view of the three-dimensional image display apparatus. As shown in FIG. 2, the phase retarding part 46 has an oriented film 54 and a liquid crystal film 56. The oriented film 54 is formed on the entire rear surface of the resin base 50. An example of the thickness of the oriented film 54 is 10 to 100 nm. A generally known photoaligned compound can be applied as the oriented film 54. Examples of the photoaligned compound include a photolyzed compound, a photodimerized compound, a photoisomerized compound and the like. Molecules of the liquid crystal film 56 are oriented corresponding to the orientation of the oriented film 54. The orientation of the oriented film 54 and the liquid crystal film 56 corresponds to the optical axes of the above-described phase retarding part 46 and phase retarding part 48. An example of the thickness of the liquid crystal film 56 is approximately 1 to 2 μm. Accordingly, the thickness of the oriented film 54 and the liquid crystal film 56 is thin as compared with the thickness of the resin base 50, the adhesive layers 24, 32, 44, the polarizing plates 22, 34 and the like.

Next, operation of the above-described three-dimensional image display apparatus 10 is explained. First, in the three-dimensional image display apparatus 10, the light source 12 irradiates with light forward. The irradiated light is unpolarized light that is substantially uniform in terms of the light amount within a vertical plane. The light is incident on the polarizing plate 22 of the image output unit 14. Here, the polarizing plate 22 has the transmission axis that is inclined by 45° from the horizontal direction, and the absorption axis that is orthogonal to the transmission axis. Accordingly, the light is output, from the polarizing plate 22, as linearly polarized light having the polarization axis that is parallel with the transmission axis of the polarizing plate 22.

The linearly polarized light output from the polarizing plate 22 transmits through the adhesive layer 24 and the retaining substrate 26, and is incident on the right eye image generating unit 38 or the left eye image generating unit 40 of the optical element 28. In the optical element 28, voltage is applied to any of sub-pixels corresponding to an image to be generated. The polarization axis of the linearly polarized light that has transmitted through a sub-pixel to which voltage is applied is rotated by 90°, and the linearly polarized light is output from the optical element 28. On the other hand, the polarization axis of the linearly polarized light that has transmitted through a sub-pixel to which voltage is not applied is not rotated, and the linearly polarized light is output from the optical element 28. Note that, although the example relates to a normally white mode, the optical element 28 may be adapted to a normally black mode in which the polarization axis of the linearly polarized light that transmits through a sub-pixel to which voltage is not applied is rotated by 90°.

The linearly polarized light that has been output from the optical element 28 transmits through the retaining substrate 30 and the adhesive layer 32, and then is incident on the polarizing plate 34. Here, the transmission axis of the polarizing plate 34 is orthogonal to the transmission axis of the polarizing plate 22. Accordingly, the linearly polarized light whose polarization axis is rotated by 90° by the optical element 28 transmits through the polarizing plate 34. On the other hand, the linearly polarized light whose polarization axis is not rotated by the optical element 28 is absorbed by the polarizing plate 34.

Among the linearly polarized light that has transmitted through the polarizing plate 34, the linearly polarized light output from the right eye image generating unit 38 of the optical element 28 is incident on the phase retarding part 46 of the retarder 16. The phase retarding part 46 has a vertical optical axis. Thereby, the linearly polarized light output from the right eye image generating unit 38 is modulated by the phase retarding part 46 and output as the clockwise circularly polarized light. On the other hand, among the linearly polarized light that has transmitted through the polarizing plate 34, the linearly polarized light output from the left eye image generating unit 40 of the optical element 28 is incident on the phase retarding part 48. The phase retarding part 48 has a horizontal optical axis. Thereby, the linearly polarized light output from the left eye image generating unit 40 is modulated by the phase retarding part 48 and output as the counterclockwise circularly polarized light.

The circularly polarized light output from the phase retarding part 46 and the phase retarding part 48 transmits through the resin base 50 and the anti-reflection film 18, and is output from the three-dimensional image display apparatus 10. The circularly polarized light is incident on the polarized glasses worn by the user. The right eye lens of the polarized glasses worn by the user transmits the clockwise circularly polarized light, and the left eye lens transmits the counterclockwise circularly polarized light. Thereby, the clockwise circularly polarized light is incident on the right eye of the user, and the counterclockwise circularly polarized light is incident on the left eye of the user. As a result, the user can view a three-dimensional image.

Next, a manufacturing method of the above-described three-dimensional image display apparatus is explained. First, the optical element 28 that is retained between the transparent retaining substrate 26 and the retaining substrate 30 is manufactured. Next, the adhesive layer 24 is applied onto or laminated on the retaining substrate 26, and then the polarizing plate 22 is pasted onto the retaining substrate 26 via the adhesive layer 24. Next, after the adhesive layer 32 is applied onto or laminated on the retaining substrate 30, the polarizing plate 34 is pasted onto the retaining substrate 30 via the adhesive layer 32. Thereby, the resin polarizing plate 34 is pasted with the adhesive layer 32 on a side of the retaining substrate 30 opposite to a side on which the optical element 28 is retained. As a result, the image output unit 14 that outputs image light that has a particular polarization is completed.

Next, the oriented film 54 is applied onto the transparent resin base 50. After irradiating with polarized light such as ultraviolet light onto the oriented film 54 in an area corresponding to the phase retarding part 46, the oriented film 54 in an area corresponding to the phase retarding part 48 is irradiated with polarized light. Thereby, the oriented film 54 is oriented in a predetermined direction. The liquid crystal film 56 is applied onto the oriented film 54 that has been oriented, and is cured by drying or ultraviolet irradiation. Thereby, the liquid crystal film 56 is oriented along with the orientation of the oriented film 54, and the plurality of pairs of the phase retarding parts 46 and the phase retarding parts 48 are formed on the resin base 50. As a result, the retarder 16 having the plurality of the phase retarding parts 46 and the plurality of the phase retarding parts 48 that output incoming image light as mutually intersecting circularly polarized light.

Next, the adhesive layer 44 that is harder than the adhesive layer 32 is applied onto or laminated on the front surface of the polarizing plate 34 or the rear surface of the retarder 16. Thereafter, the retarder 16 is pasted onto the polarizing plate 34 via the adhesive layer 44. By irradiating the adhesive layer 44 with ultraviolet light in this state, the adhesive layer 44 is cured. Thereby, the phase retarding part 46 and the phase retarding part 48 of the retarder 16 are pasted with the adhesive layer 44 onto the polarizing plate 34 of the image output unit 14. Thereafter, by providing the anti-reflection film 18 to the retarder 16 and attaching the light source 12, the three-dimensional image display apparatus 10 is completed.

As described above, in the three-dimensional image display apparatus 10, the adhesive layer 44 is as hard as or harder than the adhesive layer 32. Here, although the resin base 50 of the retarder 16 expands or contracts due to heat generated by the three-dimensional image display apparatus 10 or the temperature or humidity of the operating environment, the retaining substrate 26 and the retaining substrate 30 expand or contract little as compared with the resin base 50. However, because the adhesive layer 44 in the three-dimensional image display apparatus 10 is hard, dimensional changes of the retarder 16 can be suppressed regardless of the thermal expansion coefficient of the resin base 50. Accordingly, the three-dimensional image display apparatus 10 can suppress positional deviation of the phase retarding part 46 and the phase retarding part 48 that are formed on the resin base 50 in relation to the right eye image generating unit 38 and the left eye image generating unit 40 that are formed on the retaining substrate 26 and the retaining substrate 30. Thereby, the three-dimensional image display apparatus 10 allows efficient incidence of linearly polarized light output from the right eye image generating unit 38 onto the phase retarding part 46, and efficient incidence of linearly polarized light output from the left eye image generating unit 40 onto the phase retarding part 48. As a result, the three-dimensional image display apparatus 10 can mitigate degradation of image quality of a three-dimensional image, and provide an appropriate 3D moving image. Also, even when the resin base 50 which includes TAC (triacetylcellulose) that contracts or expands easily due to humidity or heat is used, the above-described effects can be attained with the three-dimensional image display apparatus 10. Furthermore, because the adhesive layer 44 is hard, dimensional changes of the polarizing plate 34 can be suppressed. Note that criterion for determining whether the adhesive layer is hard or not is described below.

Because positional deviation of the phase retarding part 46 and the phase retarding part 48 in relation to the right eye image generating unit 38 and the left eye image generating unit 40 is suppressed by using the hard adhesive layer 44 in the three-dimensional image display apparatus 10, the adhesive layer 32 can be made less hard. As a result, the stress that acts between the retaining substrate 30 and the polarizing plate 34 that may result from using the hard adhesive layer 32 can be reduced. As a result, the three-dimensional image display apparatus 10 can mitigate degradation of image quality such as decoloration due to the stress.

The three-dimensional image display apparatus 10 can suppress positional deviation of the phase retarding part 46 and the phase retarding part 48 in relation to the right eye image generating unit 38 and the left eye image generating unit 40 by using the retarder 16 that is thinner than the polarizing plate 34.

Figure 3:
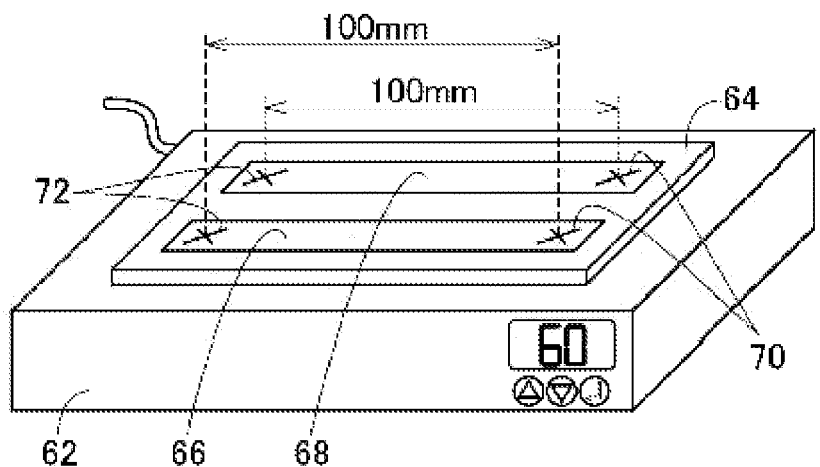
FIG. 3 is an overall configuration diagram of an experimental device that measures dimensional changes.

Next, a measurement experiment about dimensional changes conducted to demonstrate the above-described effects is explained. First, an experimental method is explained. FIG. 3 is an overall configuration diagram of an experimental device that measures dimensional changes. As shown in FIG. 3, in the experiment, a quartz glass 64 with the thickness of 4.8 mm was placed on a hot plate 62. A sample 66 and a sample 68 were placed on the quartz glass 64. Then, a mark 70 and a mark 72 were provided on both the ends of each of the sample 66 and the sample 68. The initial distance between the mark 70 and the mark 72 was 100 mm. In this state, the temperature of the sample 66 and the sample 68 was raised from 25 to 55° C. by the hot plate 62, and the temperature was maintained at 55° C. for 240 minutes. Thereafter, the temperature was lowered to the room temperate by natural cooling. Then, dimensional changes between the mark 70 and the mark 72 were measured every 20 minutes from the start of the temperature rise until the temperature was lowered to the room temperature. Among the dimensional changes measured every 20 minutes, the largest change from the initial length L (=100 mm) was denoted as L1. Whether a change L1 is expansion or contraction is indicated with a plus sign "+" or a minus sign "−", respectively. A temperature change is denoted with δt (=30° C.). Based on these, a dimensional change Δ per 1° C. was obtained by the following equation.

$$\Delta[\text{ppm}/°\text{C.}] = \{(L1-L) \div (\delta t \times L)\} \times 10^6$$

Figure 4:
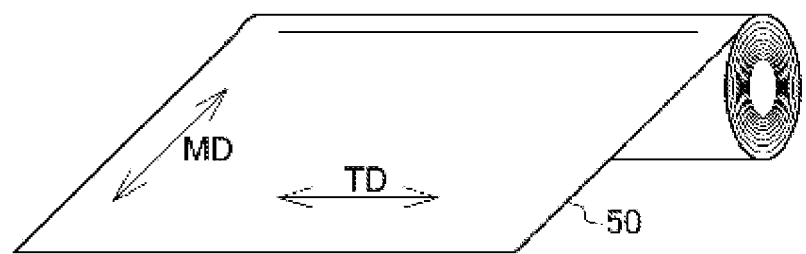
FIG. 4 is a diagram for explaining measurement directions of dimensional changes.

FIG. 4 is a diagram for explaining measurement directions of dimensional changes. Dimensional changes of the sample 66 were measured in the width direction (=TD) of the resin base 50 manufactured in the rolled state shown in FIG. 4. Dimensional changes of the sample 68 were measured in the mechanical feed direction (=MD; orthogonal to the width direction) of the resin base 50 manufactured in the rolled state. Note that the measurement of dimensional changes was performed using BH-V504 manufactured by Mitsutoyo Corporation.

Figure 5:
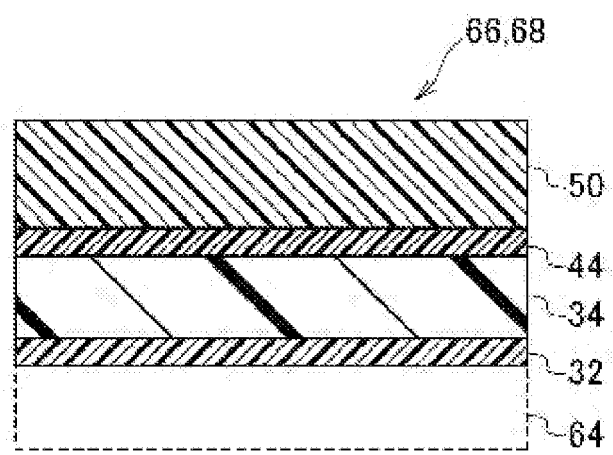
FIG. 5 is a cross-sectional view of a sample used in a measurement experiment about dimensional changes.

FIG. 5 is a cross-sectional view of a sample used in a measurement experiment about dimensional changes. As shown in FIG. 5, the adhesive layer 32, the polarizing plate 34, the adhesive layer 44 and the resin base 50 are laminated in this order on the quartz glass 64 in the sample 66 and the sample 68. The experiment was performed by placing the quartz glass 64 of the sample 66 and the sample 68 on the experimental device shown in FIG. 3. Note that, as described above, the thickness of the oriented film 54 and the liquid crystal film 56 constituting the phase retarding parts 46, 48 is extremely smaller than the thickness of the adhesive layer 32, the polarizing plate 34, the adhesive layer 44 and the resin base 50. Because the influence on the dimensional changes is accordingly assumed to be small, the experiment about dimensional changes was performed on the samples 66, 68 from which the oriented film 54 and the liquid crystal film 56 were omitted.

FIG. 6 is a table that shows experimental results about dimensional changes. Note that the dimensional change rates (unit: ppm/° C.) shown in FIG. 6 are based on dimensional changes in a state that a sample in each example is kept at the temperature of 55° C. Also, dimensional change rates A in FIG. 6 show dimensional change rates of the resin base 50, and dimensional change rates B indicate dimensional change rates of the samples 66, 68. As shown in FIG. 6, all Examples 1 to 6 showed that dimensional changes of the retarder 16 were smaller as compared with those in Comparative Examples 1 and 2. In particular, in the cases of Examples 2, 5 and 6, dimensional changes could be suppressed by making the adhesive layer 44 extremely hard even when the adhesive layer 32 is soft. Also, as shown in FIG. 6, dimensional changes were likewise small regardless of whether constituting materials of the resin base 50 are COP or TAC.

Figure 7:
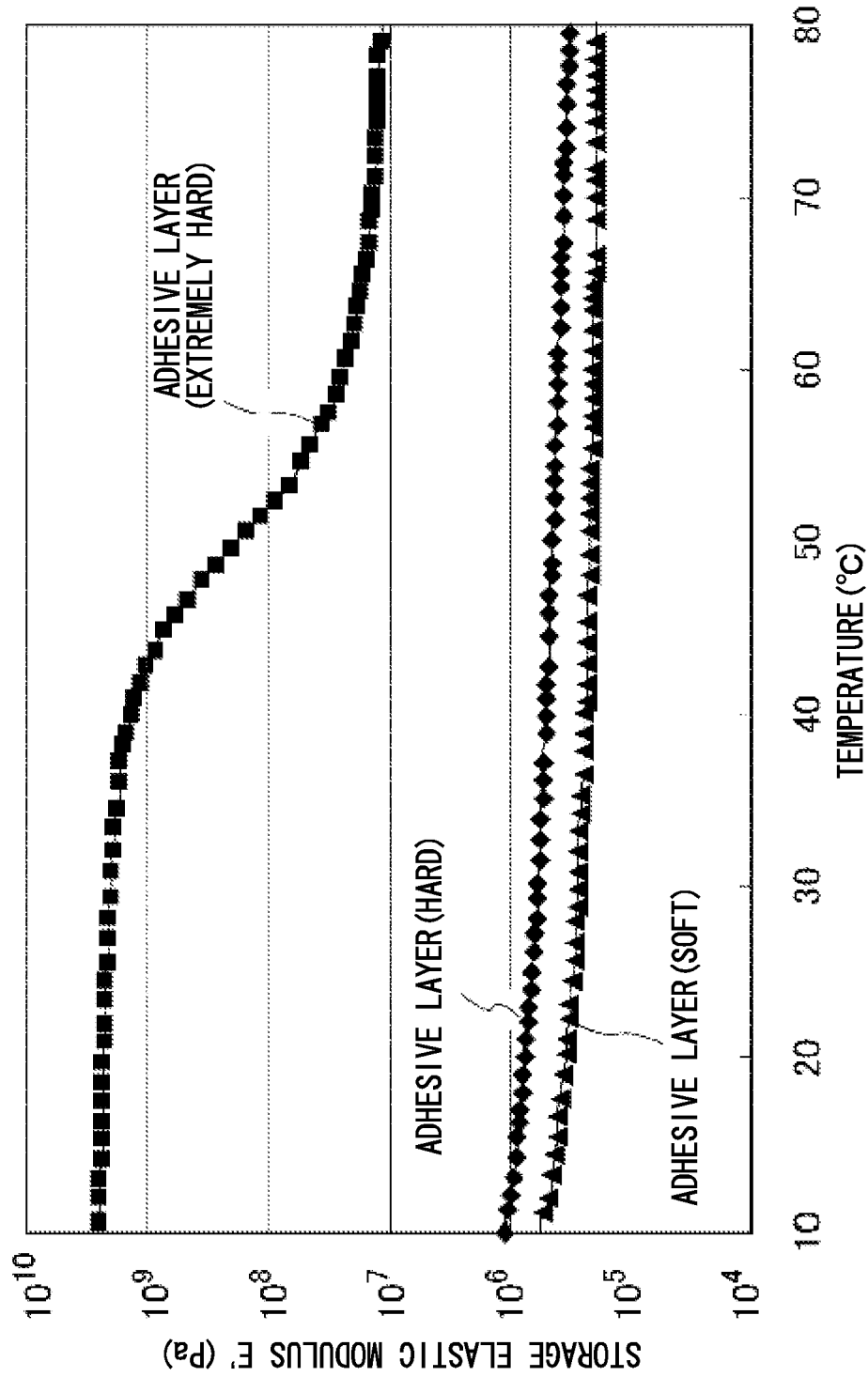
FIG. 7 is a graph that shows temperature dependency of a storage elastic modulus.

FIG. 7 is a graph that shows temperature dependency of a storage elastic modulus. The horizontal axis indicates temperature, and the vertical axis indicates a storage elastic modulus (E'). Note that "soft", "hard" and "extremely hard" in parentheses indicated in FIG. 7 correspond to the characteristics of the adhesive layer 32 and the adhesive layer 44 shown in FIG. 6. The storage elastic modulus in this experiment was measured by using RASII manufactured by TA Instruments Japan. The storage elastic modulus of each adhesive layer was measured under the following conditions: the tensile mode, the rate of temperature rise at 10° C./min.; the frequency of 1 Hz; and the temperate of −50 to 100° C. The sample of each adhesive layer was formed to be a square with the thickness of 200 to 400 μm and each side having the length of 10 to 30 mm. Here, in the present embodiment, conditions about hardness of the adhesive layer 32 that is an example of the first adhesive layer and the adhesive layer 44 that is an example of the second adhesive layer are distinguished by a storage elastic modulus in the temperature range of 20 to 70° C. which is assumed to be a general operating temperature range for the three-dimensional image display apparatus. That is, the storage elastic modulus of the adhesive layer 44 in the temperature range of 20 to 70° C. only has to be higher than the storage elastic modulus of the adhesive layer 32. When this condition is satisfied, the adhesive layer 44 is evaluated as being harder than the adhesive layer 32. Accordingly, the condition that the adhesive layer 44 is harder than the adhesive layer 32 is satisfied when, in FIG. 7, the adhesive layer 44 is an adhesive layer (extremely hard), and the adhesive layer 32 is (hard). Also, when the adhesive layer 44 is an adhesive layer (hard) and the adhesive layer 32 is an adhesive layer (soft), the condition that the adhesive layer 44 is harder than the adhesive layer 32 is satisfied.

The adhesive layer 44 indicated to have a characteristic of being "extremely hard" in FIG. 6, and the adhesive layer (extremely hard) shown in FIG. 7 are ultraviolet-curable adhesive sheets. The adhesive sheet was manufactured in the following procedure. First, a resin composition containing a prepolymer, an initiator and a solvent was prepared. Next, after the resin composition was applied onto a mould releasing surface of a mould releasing film using a coater, the solvent was evaporated at 130° C. for 5 minutes, and an adhesive sheet having the thickness after drying of 30 μm was manufactured.

In this adhesive sheet curing method, after the manufactured adhesive sheet was laminated according to the constitution of the samples 66, 68 in the examples, the adhesive sheet was cured by being irradiated with ultraviolet light so that the total irradiation of the ultraviolet light becomes 5000 to 10000 mJ/cm². Note that the storage elastic modulus shown in FIGS. 6 and 7 indicates a storage elastic modulus after curing.

A prepolymer to have a storage elastic modulus after ultraviolet curing of approximately 2 GPa was selected as the prepolymer used in the resin composition. Specifically, a predetermined storage elastic modulus could be attained by using a prepolymer having a weight-average molecular weight of $2\times10^4$ to $5\times10^5$, a glass-transition temperature of 15 to 30° C., and an equivalent of double bonds of 400 to 600 eq/g. The amount of the added prepolymer was 100 parts by weight in terms of solid content.

The initiator used was a radical polymerization initiator. Specifically, Darcure TPO manufactured by BASF was used. The amount of the initiator added was 10 parts by weight (solid content) with respect to 100 parts by weight of the solid prepolymer.

The solvent used was methyl ethyl ketone. The amount of the solvent initially added was 25 parts by weight.

The adhesive layers indicated to have a characteristic of being "hard" in FIGS. 6 and 7 was a pressure sensitive adhesive sheet made of an adhesive. The pressure sensitive adhesive sheet was manufactured in the following procedure. First, a resin composition containing a main agent, a cross-linking agent and a solvent was prepared. Next, after the resin composition was applied onto a mould releasing surface of a mould releasing film using a coater, the solvent was evaporated at 100° C. for 1 minute, and a pressure sensitive adhesive sheet having the thickness after drying of 25 μm was manufactured.

The main agent used in the resin composition was an acrylic acid ester copolymer. Specifically, SK Dyne 2094 manufactured by Soken Chemical Engineering Co., Ltd. with a solid content of 25% was used. The amount added was 100 parts by weight. The cross-linking agent used was a polyfunctional epoxy compound. Specifically, 0.4 parts by weight of E-AX manufactured by Soken Chemical Engineering Co., Ltd. were added. The solvent added was 30 parts by weight of toluene. Thereby, the adhesive layer having a characteristic of being "hard" was manufactured. The storage elastic modulus of this adhesive layer having a characteristic of being "hard" was 0.7 MPa. Note that, in this paragraph, the amounts of the main agent and the cross-linking agent that were added are indicated in the unit of parts by weight of the dissolved matters.

The adhesive layers indicated to have a characteristic of being "soft" in FIGS. 6 and 7 was a pressure sensitive adhesive sheet made of an adhesive. The pressure sensitive adhesive sheet was manufactured in the following procedure. First, a resin composition containing a main agent, a cross-linking agent and a solvent was prepared. Next, after the resin composition was applied onto a mould releasing surface of a mould releasing film using a coater, the solvent was evaporated at 100° C. for 1 minute, and a pressure sensitive adhesive sheet having the thickness after drying of 25 μm was manufactured.

The main resin used in the resin composition was an acrylic acid ester copolymer. Specifically, Oribain EG-655 manufactured by TOYO Ink Co., Ltd. with a solid content of 23% was used. The amount added was 100 parts by weight. The cross-linking agent used was a xylylene diisocyanate compound. Specifically, 0.04 parts by weight of BXX-5627 manufactured by TOYO Ink Co., Ltd. were added. The solvent added was 30 parts by weight of toluene. Thereby, the adhesive layer having a characteristic of being "soft" was manufactured. The storage elastic modulus of this adhesive layer having a characteristic of being "soft" was 0.3 MPa. Note that, in this paragraph, the amounts of the main agent and the cross-linking agent that were added are indicated in the unit of parts by weight of the dissolved matters.

Although in the above-described embodiment, the phase retarding part 46 and the phase retarding part 48 output circularly polarized light that is orthogonal to each other, the phase retarding part 46 and the phase retarding part 48 may output mutually intersecting linearly polarized light.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A three-dimensional image display apparatus comprising:
   an image output unit that outputs image light that has a particular polarization, the image output unit having:
   a retaining substrate including a transparent glass;
   an optical element retained by the retaining substrate; and
   a resin polarizing plate pasted with a first adhesive layer on a side of the retaining substrate opposite to a side where the optical element is retained; and
   a retarder that is pasted onto the polarizing plate with a second adhesive layer and has:
   a transparent resin base; and
   a plurality of phase retarding parts that are provided on the resin base and output the image light as mutually differently polarized light, the image light having been incident on the plurality of phase retarding parts,
   wherein the second adhesive layer is harder than the first adhesive layer, and
   the storage elastic modulus of the first adhesive layer is more than or equal to about 0.3 MPa and less than or equal to about 0.7 MPa, the storage elastic modulus of the second adhesive layer is more than or equal to about 0.7 MPa and less than or equal to about 2.3 GPa, and the storage elastic modulus of the first adhesive layer is less than the storage elastic modulus of the second adhesive layer.

2. The three-dimensional image display apparatus according to claim 1, wherein the retarder is thinner than the polarizing plate.

3. A method of manufacturing a three-dimensional image display apparatus, the method comprising:
   manufacturing an image output unit that outputs image light that has a particular polarization, the image output unit having:
   a retaining substrate including a transparent glass;
   an optical element retained by the retaining substrate; and
   a resin polarizing plate pasted with a first adhesive layer on a side of the retaining substrate opposite to a side where the optical element is retained;
   manufacturing a retarder that has:
   a transparent resin base; and
   a plurality of phase retarding parts that are provided on the resin base and output the image light as mutually differently polarized light, the image light having been incident on the plurality of phase retarding parts; and pasting the retarder onto the image output unit with a second adhesive layer that is harder than the first adhesive layer, wherein the storage elastic modulus of the first adhesive layer is more than or equal to about 0.3 MPa and less than or equal to about 0.7 MPa, the storage elastic modulus of the second adhesive layer is more than or equal to about 0.7 MPa and less than or equal to about 2.3 GPa, and the storage elastic modulus of the first adhesive layer is less than the storage elastic modulus of the second adhesive layer.

4. The three-dimensional image display apparatus according to claim 1, wherein the storage elastic modulus of the second adhesive layer is 2.0 GPa to 2.3 GPa.

5. The three-dimensional image display apparatus according to claim 1, the storage elastic modulus of the first adhesive layer is about 0.3 MPa.

6. The three-dimensional image display apparatus according to claim 1, wherein the second adhesive layer is an ultraviolet-curable adhesive.

7. The three-dimensional image display apparatus according to claim 6, wherein the first adhesive layer is a non-ultraviolet-curable adhesive.

8. The three-dimensional image display apparatus according to claim 1, wherein the second adhesive layer is a non-ultraviolet-curable adhesive.

9. The three-dimensional image display apparatus according to claim 4, wherein the second adhesive layer is an ultraviolet-curable adhesive.

10. The three-dimensional image display apparatus according to claim 9, wherein the first adhesive layer is a non-ultraviolet-curable adhesive.

\* \* \* \* \*